July 10, 1928.

H. KRAUSE

LINE SHAFT BEARING

Filed March 26, 1924

Inventor:
Hermann Krause.

Witness:
Erwin B. Ewing

Patented July 10, 1928.

1,676,784

UNITED STATES PATENT OFFICE.

HERMANN KRAUSE, OF MENOMONEE FALLS, WISCONSIN.

LINE-SHAFT BEARING.

Application filed March 26, 1924. Serial No. 701,964.

This invention relates to bearings and is particularly directed to a bearing adapted for use in connection with shafts.

Objects of this invention are to provide a bearing which will adapt an ordinary shaft for use with a roller bearing, which is so constructed that it may be applied to a loose pulley or to a hanger bearing for the shaft, which is adapted to take up the wear in the bearing, which is adapted to retain lubricant, and which has means for rigidly attaching a portion of the bearing to the shaft.

Embodiments of the invention are shown in the accompanying drawings, in which:—

Figure 1:
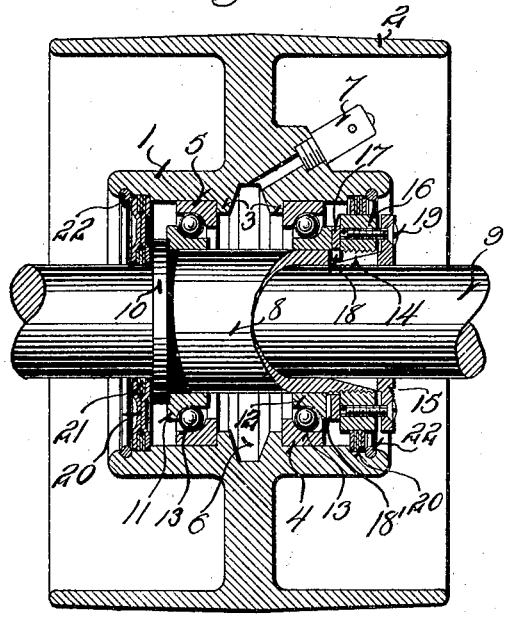
Figure 1 is a sectional view through a bearing showing it applied to a loose pulley or idler pulley.
Figure 2:
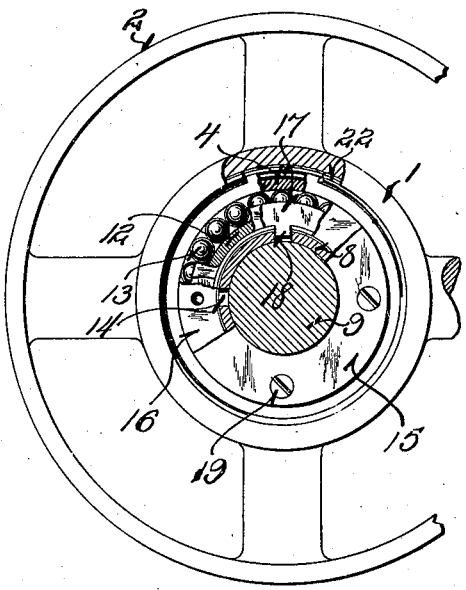
Figure 2 is an end view partly broken away of the structure shown in Figure 1.

Figures 1 and 2, showing one form of the invention, will first be described. In this form an outer casing 1 is provided which may be a portion of the pulley 2, as shown. This outer casing is provided with a pair of shoulders 3 against which the outer race rings 4 and 5 of ball bearings are positioned. If desired, the casing 1 may have an enlarged recess 6 for the retention of a material amount of lubricant and any form of oiler 7 may be employed and may communicate with such space.

A sleeve 8 is accurately fitted to the shaft 9 and is slidably mounted upon such shaft. This sleeve is provided at one end with a collar 10 against which an inner race ring 11 is positioned. A second inner race ring 12 is mounted upon the sleeve adjacent its other end, and in proximity to the ring end 4. Balls 13 are mounted between adjacent rings.

The sleeve 8 is provided with a tapered cut out adjacent the end remote from the flange 10, and a split collet 14, integrally formed with a washer 15, is fitted within this cut out. The sleeve is externally threaded at this end, and a nut 16 is screwed upon such threaded portion. A washer 17 is mounted between the nut 16 and the race ring 12 and is provided with a tongue 18 fitted within a longitudinally extending key way formed in the outer end of the sleeve 8 to prevent rotation of such collar relative to the sleeve, and to thus prevent rotation of the nut. The washer 17 and the race ring 12 are provided with interengaging portions such as a key and key way 18, to prevent rotation of the ring 12 with reference to the washer.

Means are provided for drawing the washer 15 with its collet towards the sleeve 8. This means may comprise a plurality of screws 19 freely passing through the washer 15 and threaded into the nut 16. Thus when the screws 19 are tightened the collet binds tightly against the shaft and locks the shaft to the sleeve.

At opposite ends of the casing 1 apertured disks 20 are provided which receive felt washers 21 which bear against the inner portion of the casing 1 and against the shaft and the nut 16, respectively, to prevent loss of lubricant,—suitable spring rings 22 seated within grooves formed in the casing 1, being used to retain the washers in position.

Figure 3:
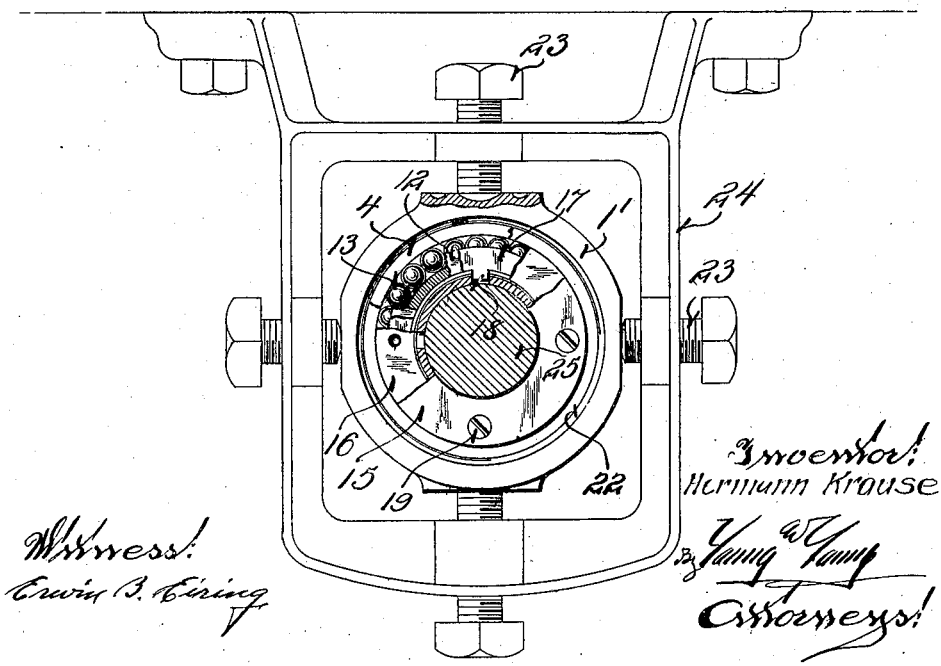
Figure 3 is a view showing the application of this bearing to a hanger bearing.

In the form shown in Figure 3, the outer casing 1' is shown as held by a plurality of screws 23, carried by a hanger bracket 24. This construction is used when it is desired to support a line shaft 25. The construction, other than that just described, is identically the same as the construction illustrated and described in detail in connection with Figures 1 and 2, and will not, therefore, be repeated.

It will thus be seen that a bearing has been provided which is designed to cooperate with a shaft and to adapt the shaft to roller bearing supports at any point in its extent without requiring any alteration whatsoever in the shaft.

It will further be seen that a ball bearing has been provided which may be cheaply constructed, which may be quickly applied, and which is effective in its adjustments and in its operation.

Although the invention has been described in considerable detail, it is to be understood that the invention may be variously embodied and is, therefore, to be limited only as claimed.

I claim:

1. A bearing for a shaft comprising an outer casing having oppositely directed raceway rings, a sleeve mounted upon said shaft and having a flange at one end, a race way ring carried by said sleeve and abutting said flange, a second race way ring carried by said sleeve, the rings carried by said sleeve being mounted in proximity to said first mentioned rings, balls located between adjacent rings, said sleeve being externally threaded at the end remote from said flange and having a tapered cut out portion contracting to said shaft, a nut screwed upon said externally threaded end for adjusting the last mentioned raceway ring, a washer having a tapered collet fitted within said tapered cut out, and screws for drawing said washer towards said nut to cause said collet to grip said shaft, whereby the screws may be adjusted without rotating said nut.

2. A bearing for a shaft comprising an outer casing having oppositely directed race way rings, a sleeve mounted upon said shaft and having a flange at one end, a raceway ring carried by said sleeve and abutting said flange, a second raceway ring carried by said sleeve, the rings carried by said sleeve being mounted in proximity to said first mentioned rings, balls located between adjacent rings, said sleeve being externally threaded at the end remote from said flange and having a tapered cut out portion contracting to said shaft, a nut screwed upon said externally threaded end for adjusting the last mentioned raceway ring, a washer having a tapered collet fitted within said tapered cut out, screws for drawing said washer towards said nut to cause said collet to grip said shaft, said sleeve having a key way therein, and a washer interposed between said nut and the adjacent ring and having a tongue fitting said key way.

In testimony that I claim the foregoing I have hereunto set my hand at Menomonee Falls, in the county of Waukesha and State of Wisconsin.

HERMANN KRAUSE.